(12) United States Patent
Zebolsky et al.

(10) Patent No.: US 6,692,013 B1
(45) Date of Patent: Feb. 17, 2004

(54) FIFTH WHEEL SUSPENSION

(75) Inventors: Michael L. Zebolsky, Marshall, MI (US); Timothy Fulkerson, Fulton, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/161,399

(22) Filed: Jun. 3, 2002

(51) Int. Cl.[7] ................................................ B62D 53/08
(52) U.S. Cl. ...................................... 280/439; 280/441
(58) Field of Search .............................. 280/439, 440, 280/441, 438.1, 433

(56) References Cited

U.S. PATENT DOCUMENTS

| | | | |
|---|---|---|---|
| 2,093,761 A | 9/1937 | Kramer | 280/33.1 |
| 2,391,372 A | 12/1945 | Weigand | 280/33.1 |
| 4,614,355 A * | 9/1986 | Koch | 280/438.1 |
| 4,991,864 A | 2/1991 | Potsch | 280/441 |
| 5,449,191 A * | 9/1995 | Cattau | 280/438.1 |
| 5,707,070 A * | 1/1998 | Lindenman et al. | 280/438.1 |
| 5,839,745 A * | 11/1998 | Cattau et al. | 280/434 |
| 5,964,476 A | 10/1999 | Maines | 280/433 |
| 6,474,674 B2 * | 11/2002 | Piercey, III | 280/441 |
| 6,557,883 B2 * | 5/2003 | Linger et al. | 280/441 |
| 6,581,951 B2 * | 6/2003 | Lange | 280/440 |
| 6,592,140 B1 * | 7/2003 | Alguera Gallego et al. | 280/441 |

* cited by examiner

*Primary Examiner*—Lesley D. Morris
*Assistant Examiner*—Tony Winner
(74) *Attorney, Agent, or Firm*—Dykema Gossett PLLC

(57) ABSTRACT

A fifth wheel suspension assembly for damping movement between a towed vehicle and a towing vehicle is provided. The suspension assembly includes two rods on which a fifth wheel base is mounted. The fifth wheel base moves along the two rods in a direction of the longitudinal axis of the towing vehicle. The fifth wheel base defines two bores through which the rods extend. These bores also define fluid chambers disposed about the rods. Pistons are disposed about the rods within the fluid chambers and serve to dampen oscillatory movements of the towed vehicle relative to the towing vehicle. Springs disposed about the rods on either side of the base further dampen pitch motions imparted to the towing vehicle by the towed vehicle.

20 Claims, 2 Drawing Sheets

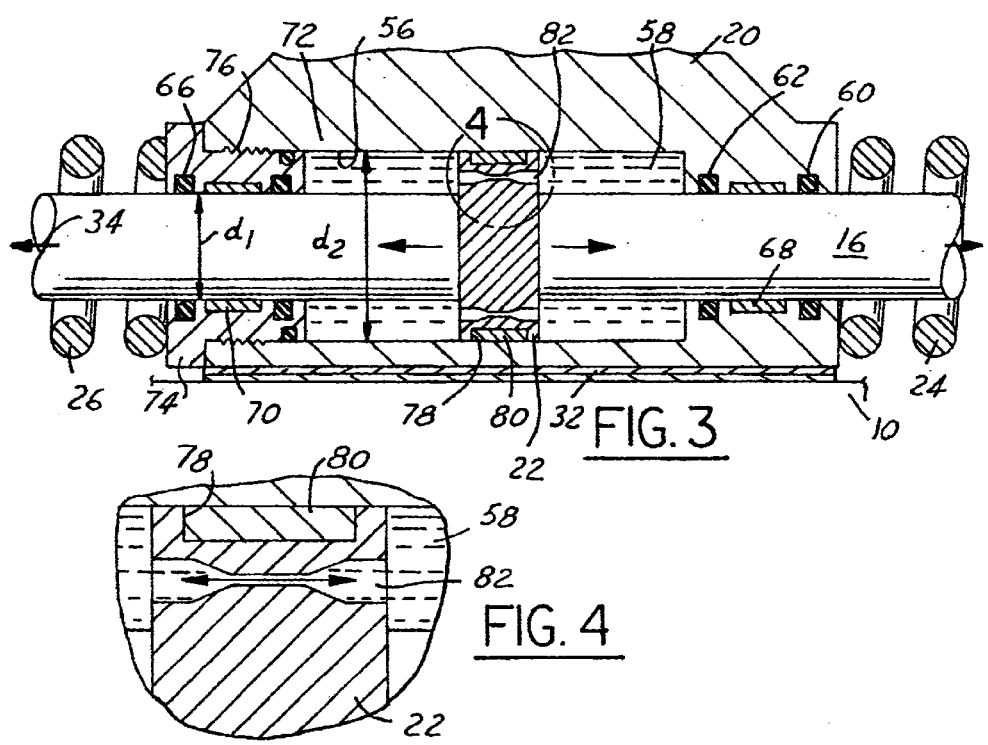

FIFTH WHEEL SUSPENSION

BACKGROUND OF THE INVENTION

1. Field of the Invention

This invention relates to fifth wheel hitches and, in particular, to a suspension assembly for a fifth wheel that is used to reduce unwanted pitching motions and oscillations in a towing vehicle.

2. Discussion of Related Art

Fifth wheel hitches are used to connect a towed load, such as a trailer, to a towing vehicle, such as a large truck. When the load is in motion, the load creates certain unwanted motions upon the towing vehicle. These unwanted motions include pitching motions in the fore/aft direction of the towing vehicle. When, for example, the towing vehicle starts or stops, speeds or slows, the towed load exerts forces that "push" or "pull" on the towing vehicle. Also, unwanted oscillations exerted on the towed vehicle may be transferred to the towing vehicle. For example, if the wheels of the towed vehicle moved over a bump or hole in the road, the resulting oscillatory motions would be transferred to the towing vehicle. These motions are transferred from the road surface through the trailer suspension into the trailer structure, through the fifth wheel and into the towing vehicle. Just as towed vehicle motion forces can be transferred to the towing vehicle, likewise, motion forces affecting the towing vehicle also may be transmitted to the towed load.

Conventional fifth wheels have several disadvantages in that they do not contain any mechanism for damping the unwanted pitching motions and oscillations transferred between the towing vehicle and the towed load. These unwanted motions result in a more unpleasant and dangerous ride for those in the towing vehicle. These unwanted motions also put the cargo of the towed vehicle at risk, for example, if the cargo is fragile, not well secured, or an animal, such as a horse or other livestock.

In order to overcome the inherent drawbacks in conventional fifth wheel assemblies, various fifth wheel suspensions have been proposed. For example, U.S. Pat. Nos. 2,093,761 and 4,991,864 each illustrate a fifth wheel base mounted on a pair of longitudinal rods and capable of movement along the rods in the longitudinal direction of the vehicle. Springs disposed about the rods dampen movement of the fifth wheel base along the rods. These disclosed suspensions dampen movement between the towing and towed vehicles. The amount of damping provided by the disclosed suspensions, however, is limited.

The inventors herein have recognized that there is a need for a fifth wheel suspension that will minimize or eliminate one or more of the above-mentioned deficiencies.

SUMMARY OF THE INVENTION

The present invention provides a suspension assembly for damping movement between a towing vehicle and a towed vehicle.

A suspension assembly in accordance with the present invention includes first and second rods mounted to a frame of the towing vehicle, each of the first and second rods having a longitudinal axis extending in the longitudinal direction of a towing vehicle. A fifth wheel base is coupled to the towed vehicle and mounted on the first and second rods for movement in the longitudinal (fore/aft) direction of the towing vehicle. The fifth wheel base defines first and second fluid chambers that are disposed about the first and second rods. Finally, the assembly includes first and second pistons disposed within the first and second fluid chambers. The suspension assembly may further include springs disposed about the first and second rods on either side of the fifth wheel base.

A suspension assembly in accordance with the present invention represents a significant improvement as compared to conventional suspension assemblies for damping movement between a towing vehicle and a towed vehicle. In particular, the inventive suspension assembly reduces both unwanted pitching motions and oscillations, making the movement of both the towing vehicle and towed vehicle more comfortable and safer for all occupants. The present invention has a multi-faceted approach to dampening unwanted motions, both simultaneously reducing pitching motions in the fore/aft direction by allowing the towed vehicle to move in the fore/aft direction relative to the towing vehicle and dampening oscillations through the use of fluid chambers and pistons.

These and other features and objects of this invention will become apparent to one skilled in the art from the following detailed description and the accompanying drawings illustrating features of this invention by way of example.

BRIEF DESCRIPTION OF THE DRAWINGS

FIG. 3 is a sectional view taken along line 3—3 of FIG. 2.

FIG. 4 is an enlarged view of region 4 of FIG. 3.

DETAILED DESCRIPTION OF THE PREFERRED EMBODIMENTS

Figure 1:
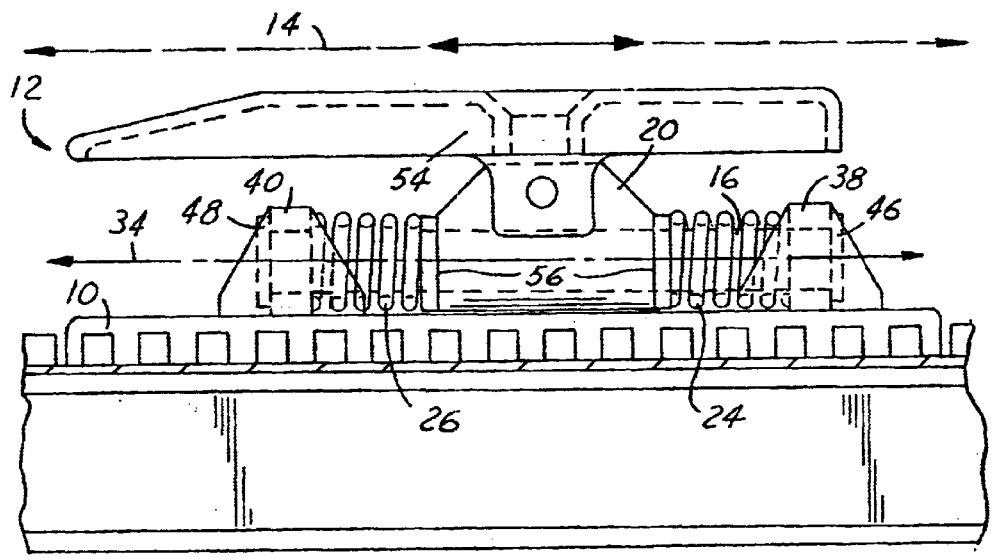
FIG. 1 is a side view of a portion of a towed vehicle incorporating a suspension assembly in accordance with a first embodiment of the present invention.
Figure 2:
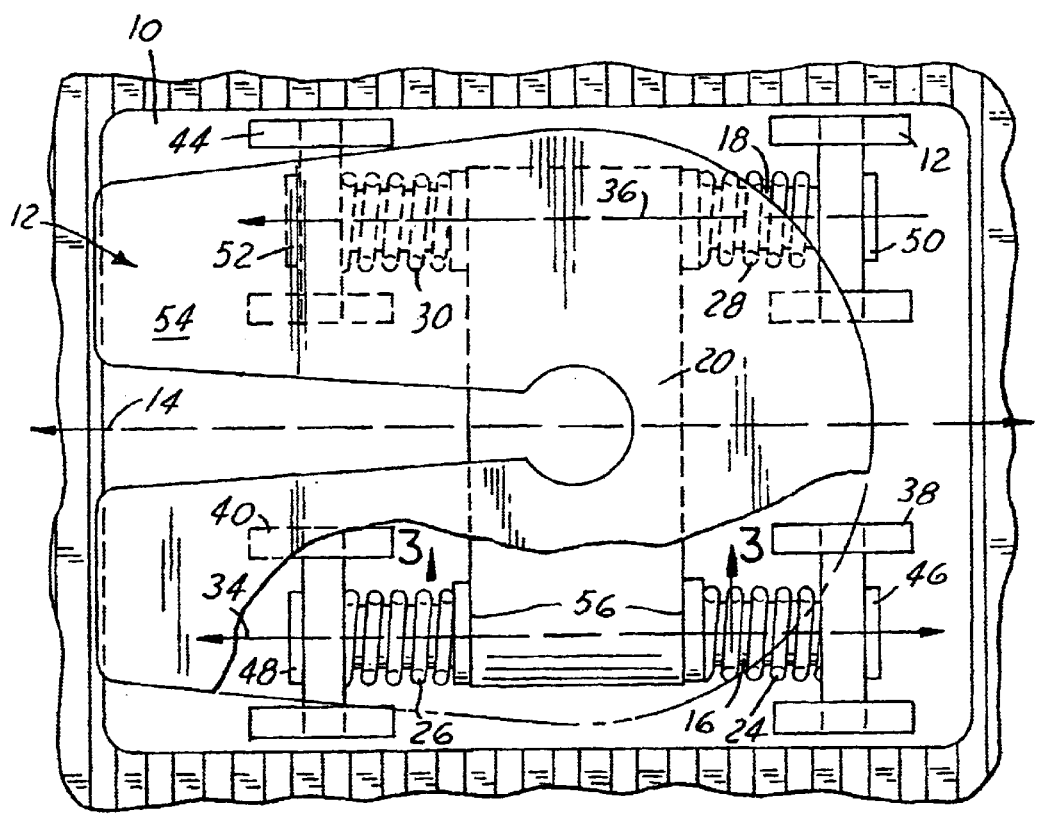
FIG. 2 is a top view of the suspension assembly of FIG. 1.

Referring now to the drawings wherein like reference numerals are used to identify identical components in the various views, FIGS. 1 and 2 illustrate a portion of a frame 10 of a towing vehicle to which a suspension assembly 12 in accordance with a first embodiment of the present invention may be mounted for damping movement between the towing vehicle and a towed vehicle. The towing vehicle and towed vehicle may comprise a conventional tractor-trailer. Both the towing vehicle and the towed vehicle are disposed about a longitudinal axis 14 extending in the direction of vehicle travel. Assembly 12 includes rods 16, 18, a fifth wheel base 20, and pistons 22 (best shown in FIGS. 3 and 4 where only one piston is shown). Assembly 12 may also include springs 24, 26, 28, 30 and a slide bushing 32 (best shown in FIG. 3).

Rods 16, 18 are provided to allow movement of fifth wheel base 20 and the towed vehicle relative to frame 10 and the towing vehicle. Rods 16, 18 may be made from conventional metals and metal alloys and each includes a longitudinal axis 34, 36; respectively that extends parallel to axis 14 in the longitudinal direction of the towing vehicle. Rods 16, 18 are circular in the illustrated embodiment, but it should be understood that the shape of rods 16, 18 may be varied without departing from the spirit of the present invention. Further, it should also be understood that the number of rods may be increased to increase load capacity without departing from the spirit of the present invention. Rods 16, 18 may be tubular. Alternatively, rods 16, 18 may be solid.

Rods 16, 18 may be mounted to frame 10 in a variety of conventional ways. In the illustrated embodiment, rods 16, 18 are mounted on frame 10 using brackets 38, 40 and 42, 44, respectively, that are coupled to frame 10 in a conventional manner (e.g., by welding). In particular, each of brackets 38, 40, 42, 44 includes an aperture sized and shaped to receive one of rods 16, 18. Each longitudinal end of rods 16, 18 may include a flange 46, 48 and 50, 52, respectively, configured such that flanges 46, 48, 50, 52 cannot pass through the corresponding apertures in brackets 38, 40, 42, 44.

Fifth wheel base 20 provides a mount for a conventional fifth wheel 54 through which a towed vehicle may be connected to a towing vehicle. Base 20 may be made from conventional metals and metal alloys. In the illustrated embodiment, base 20 has generally rectangular bottom and top walls. The laterally extending forward and rear side walls of base 20 begin to taper at a point intermediate the bottom an top walls such that the top wall is smaller in area than the bottom wall. It should be understood, however, that the shape of base 20 may be varied without departing from the spirit of the present invention.

Referring to FIG. 3, base 20 defines a longitudinally extending bore 56 proximate each lateral side of base 20. Each bore 56 is configured to receive a corresponding rod 16, 18. Each bore 56 may be generally cylindrical in shape and may be disposed about a corresponding axis 34, 36. The diameter of each bore 56 may vary. In particular, each bore 56 may have a first diameter $d_1$ proximate either longitudinal end of bore 56 and a second diameter $d_2$, greater than the first diameter $d_1$, intermediate the longitudinal ends of bore 56. The first diameter $d_1$ is sized relative to a corresponding rod 16, 18. The second diameter $d_2$ is sized relative to piston 22 and defines a fluid chamber 58 within base 20 that is disposed about a corresponding rod 16, 18 and through which the rod 16, 18 extends. Fluid chamber 58 may contain hydraulic fluid. It should be understood, however, that the type and composition of fluid within chamber 58 may vary depending upon the desired damping characteristics of assembly 12. Base 20 may also define annular grooves proximate each longitudinal end of bore 56 configured to receive conventional seals 60, 62, 64, and 66 and bushings 68, 70. Seals 60, 62, 64, 66 are provided to retain fluid in chamber 58 and to prevent foreign elements and objects from entering chamber 58. Bushings 68, 70 are provided to reduce friction from the movement of base 20 over rods 16, 18.

Base 20 may include a body 72 and plugs 74 (only one of which is shown in FIG. 3). Plugs 74 are provided to allow insertion of pistons 22 during assembly of assembly 12. Plugs 74 may be sized and shaped so that, upon assembly of plugs 74 with body 72, base 20 is symmetrical about a laterally extending axis. Plugs 74 combine with body 72 to define bores 56 and fluid chambers 58. Each of plugs 74 may include a plurality of threads 76 configured to engage mating threads on body 72. Assembly 12 may be assembled by inserting rods 16, 18 through bores 56 in body 72 of base 20, placing pistons 22 on rods 16, 18, placing plugs 74 on rods 16, 18 and threading plugs 74 into body 72, mounting brackets 38, 40, 42, 44 onto the longitudinal ends of rods 16, 18 and, finally, mounting brackets 38, 40, 42, 44 onto frame 10.

Pistons 22 (only one of which is shown in FIG. 3) are provided to dampen oscillations caused by movement of the towed vehicle relative to the towing vehicle. Pistons 22 may be made from conventional metals and metal alloys. Pistons 22 may be annular in shape and are disposed about rods 16, 18 and axes 34, 36. A radially inner surface of each piston 22 is sized and shaped relative to the outer surface of a corresponding rod 16, 18. A radially outer surface of each piston 22 is sized and shaped relative to the shape of fluid chamber 58. Accordingly, piston 22 may have an outer diameter $d_2$. Referring to FIG. 4, the radially outer surface of each piston 22 may include a groove 78 configured to receive a conventional bushing 80 provided to allow pistons 22 to move within chambers 58. Pistons 22 include one or more passageways 82 extending axially therethrough through which hydraulic fluid disposed within chambers 58 may flow. As the hydraulic fluid flows through passageways 82, resistance is provided against the motion that results in dampening the motion forces placed upon the towed vehicle 12 that can be transferred to the towing vehicle. In the illustrated embodiment, each of passageways 82 is shaped similar to an hour glass. In other words, each passageway 82 is relatively narrow in the axial center and increases in size proximate its axial ends. It should be understood, however, that the number of passageways and the size and shape of the passageways may vary without departing from the spirit of the present invention.

Springs 24, 26, 28, 30 are provided to further dampen movements imparted between the towed vehicle and the towing vehicle. Springs are conventional in the art. Springs 24, 26 are disposed about rod 16 on opposite sides of base 20. Similarly, springs 28, 30 are disposed about rod 18 on opposite sides of base 20.

Bushing 32 provides vertical support for base 20 and reduces friction between base 20 and frame 10. Bushing 32 may comprise two opposed metal layers coupled to base 20 and frame 10. Although the composition of the two layers may vary, one layer may be comprised of a bronze alloy or a phonetic plastic and another layer may be comprised of steel.

A suspension assembly in accordance with the present invention represents a significant improvement as compared to conventional fifth wheel suspensions. The inventive suspension dampens movement between the towed vehicle and the towing vehicle by reducing pitch motions imparted from the towed vehicle as well as oscillatory movement of the towed vehicle relative to the towing vehicle.

While the invention has been particularly shown and described with reference to the preferred embodiments thereof, it is well understood by those skilled in the art that various changes and modification can be made in the invention without departing from the spirit and scope of the invention.

We claim:

1. A suspension assembly for damping movement between a towing vehicle and a towed vehicle, comprising:
   first and second rods mounted to a frame of the towing vehicle, each of said first and second rods having a longitudinal axis extending in the longitudinal direction of a towing vehicle;
   a fifth wheel base coupled to the towed vehicle and mounted on said first and second rods for movement in the longitudinal direction of the towing vehicle, said fifth wheel base defining first and second fluid chambers disposed about said first and second rods; and,
   first and second pistons disposed within said first and second fluid chambers.

2. The suspension assembly of claim 1 wherein said first and second rods are tubular.

3. The suspension assembly of claim 1 wherein said first and second rods extend through said first and second fluid chambers, respectively.

4. The suspension assembly of claim 1, wherein said fifth wheel base defines a first bore through which said first rod extends, said first bore having a first diameter proximate either end of said first bore and sized relative to said first rod and having a second diameter intermediate said ends and defining said first fluid chamber, said second diameter greater than said first diameter.

5. The suspension assembly of claim 1 wherein said first piston is disposed about said first rod.

6. The suspension assembly of claim 1 wherein said first piston includes an opening through which fluid disposed within said first chamber may flow from a first side of said first piston to a second side of said first piston.

7. The suspension assembly of claim 1, further comprising springs disposed about said first and second rods.

8. A suspension assembly for damping movement between a towing vehicle and a towed vehicle, comprising:

first and second rods mounted to a frame of the towing vehicle, each of said first and second rods having a longitudinal axis extending in the longitudinal direction of a towing vehicle;

a fifth wheel base coupled to the towed vehicle and mounted on said first and second rods for movement in the longitudinal direction of the towing vehicle, said fifth wheel base defining first and second fluid chambers disposed about said first and second rods;

first and second pistons disposed within said first and second fluid chambers; and, springs disposed about said first and second rods on either side of said fifth wheel base.

9. The suspension assembly of claim 8 wherein said first and second rods are tubular.

10. The suspension assembly of claim 8 wherein said first and second rods extend through said first and second fluid chambers, respectively.

11. The suspension assembly of claim 8 wherein said fifth wheel base defines a first bore through which said first rod extends, said first bore having a first diameter proximate either end of said first bore and sized relative to said first rod and having a second diameter intermediate said ends and defining said first fluid chamber, said second diameter greater than said first diameter.

12. The suspension assembly of claim 8 wherein said first piston is disposed about said first rod.

13. The suspension assembly of claim 8 wherein said first piston includes an opening through which fluid disposed within said first chamber may flow from a first side of said first piston to a second side of said first piston.

14. A suspension assembly for damping movement between a towing vehicle and a towed vehicle, comprising:

first and second rods mounted to a frame of the towing vehicle, each of said first and second rods having a longitudinal axis extending in the longitudinal direction of a towing vehicle;

a fifth wheel base coupled to the towed vehicle and mounted on said first and second rods for movement in the longitudinal direction of the towing vehicle, said fifth wheel base defining first and second fluid chambers disposed about said first and second rods;

first and second pistons disposed within said first and second fluid chambers; and, a slide bushing coupled to said fifth wheel base.

15. The suspension assembly of claim 14 wherein said first and second rods are tubular.

16. The suspension assembly of claim 14 wherein said first and second rods extend through said first and second fluid chambers, respectively.

17. The suspension assembly of claim 14 wherein said fifth wheel base defines a first bore through which said first rod extends, said first bore having a first diameter proximate either end of said first bore and sized relative to said first rod and having a second diameter intermediate said ends and defining said first fluid chamber, said second diameter greater than said first diameter.

18. The suspension assembly of claim 14 wherein said first piston is disposed about said first rod.

19. The suspension assembly of claim 14 wherein said first piston includes an opening through which fluid disposed within said first chamber may flow from a first side of said first piston to a second side of said first piston.

20. The suspension assembly of claim 14, further comprising springs disposed about said first and second rods.

\* \* \* \* \*